June 3, 1924.

B. G. KLUGH 1,496,232

STOCK FEEDING AND DISTRIBUTING APPARATUS FOR ELECTRICAL FURNACES

Filed April 3, 1922    2 Sheets-Sheet 1

INVENTOR.
B. G. Klugh.
BY
ATTORNEY.

June 3, 1924.  1,496,232
B. G. KLUGH
STOCK FEEDING AND DISTRIBUTING APPARATUS FOR ELECTRICAL FURNACES
Filed April 3, 1922 2 Sheets-Sheet 2
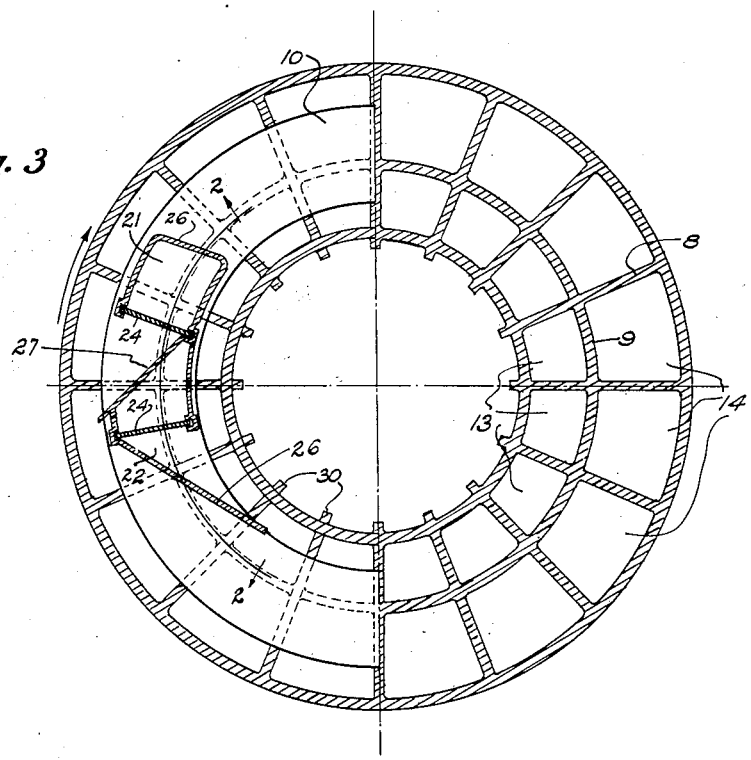
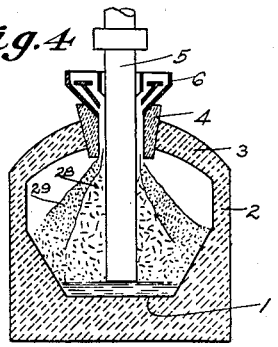
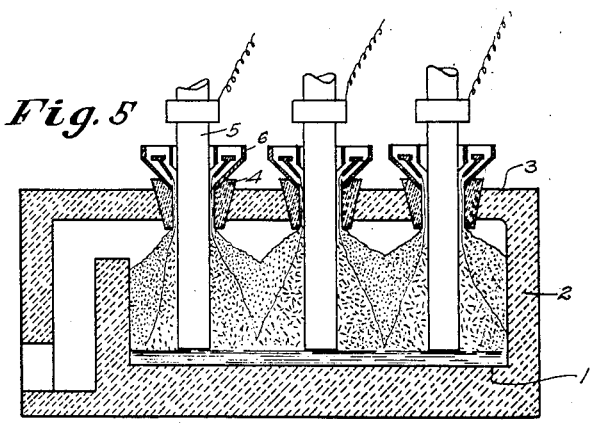
INVENTOR.
B. G. Klugh.
BY
ATTORNEY.

Patented June 3, 1924.

1,496,232

UNITED STATES PATENT OFFICE.

BETHUNE G. KLUGH, OF CHICAGO, ILLINOIS, ASSIGNOR TO FEDERAL PHOSPHORUS COMPANY, OF BIRMINGHAM, ALABAMA, A CORPORATION OF ALABAMA.

STOCK FEEDING AND DISTRIBUTING APPARATUS FOR ELECTRICAL FURNACES.

Application filed April 3, 1922. Serial No. 549,251.

*To all whom it may concern:*

Be it known that I, BETHUNE G. KLUGH, a citizen of the United States of America, residing at Chicago, in the county of Cook and State of Illinois, have invented certain new and useful Improvements in Stock Feeding and Distributing Apparatus for Electrical Furnaces, of which the following is a specification.

My invention relates to a stock feeding apparatus for electric smelting furnaces of the enclosed type, having stock feed openings in their roof, which are designed for the passage of the electrodes therethrough.

My present invention contemplates the provision in the top of the furnace, either as an integral or as a removable element, of a stock feeding conduit having a center opening of a sufficient cross-sectional area to permit the electrode to depend therethrough into the furnace and to provide surrounding the electrode a clearance ample for the overhead feed of stock through said conduit into the furnace. The purpose and advantage of this arrangement both for handling of the electrode and for the feeding of the stock form the essential feature of my pending application for Letters Patent, Serial No. 387,807.

One object of this invention is to equip the furnace with a rotary stock distributor, mechanically driven and adapted to rotate about the electrode. An important advantage gained by the use of such a distributing means is the uniform distribution circumferentially about the electrode of the previously mixed stock so that it will feed uniformly into the clearance about the electrode and maintain a substantially uniform column of stock surrounding and protecting all exposed parts of the electrode and also sealing the clearance about the electrode.

In the operation of the type of furnace described in my said pending application it was found desirable to so distribute the carbon element of the stock as to cause it to descend in juxtaposition to the electrode with the phosphate and silica stock forming a cover for the carbon. Due to the relatively smaller size of the carbon particles in the stock, as compared to the size of the phosphate rock and silica, the carbon has a tendency casually to shift towards the center of the descending stock column and to collect and concentrate about the electrode while the angle of repose of the larger component elements of the stock cause them to fall to the outside and form a cover for the carbon. To make this relative distribution of the components of the stock more positive, I contemplate designing this rotary distributor so as to feed the different component elements of the stock in different circumferential zones about the electrode. An important advantage of this arrangement is that I am enabled to feed the carbon component of the charge through the inner zone, thus insuring a more perfect protection for the electrode and a more perfect protection of the carbon component itself from premature combustion while traversing the combustion chamber. At the same time this collection of the carbon component about the electrode increases the efficiency of the conductivity of the stock and as a result improves the heating efficiency of the furnace.

A further feature of my invention contemplates the provision of means, independent in their control, for regulating the volumetric feed of the different component elements to the different zones about the electrode to the end that the control of the character and volume of the charge may be in a high degree flexible and permit the component elements to be proportioned as charged and without previous mixing.

My invention contemplates various forms of annular distributing hoppers, which are driven by any suitable mechanical or electrical means, and which receive and deliver stock into the clearance surrounding the electrode.

In the accompanying drawings, and in the specification and claims descriptive thereof, I have sought to show only embodiments of my invention which are best adapted to the present needs of the electric smelting furnaces which have been operating under my supervision.

Referring to the drawings:—

Fig. 3 is a horizontal cross-sectional view taken on the broken plane 3—3 of Fig. 1.

Figs. 4 and 5 are respectively transverse and longitudinal views in vertical cross-section taken through an enclosed electric smelting furnace more particularly adapted for the smelting of phosphatic materials.

Similar reference numerals refer to similar parts throughout the drawings.

Figure 1:
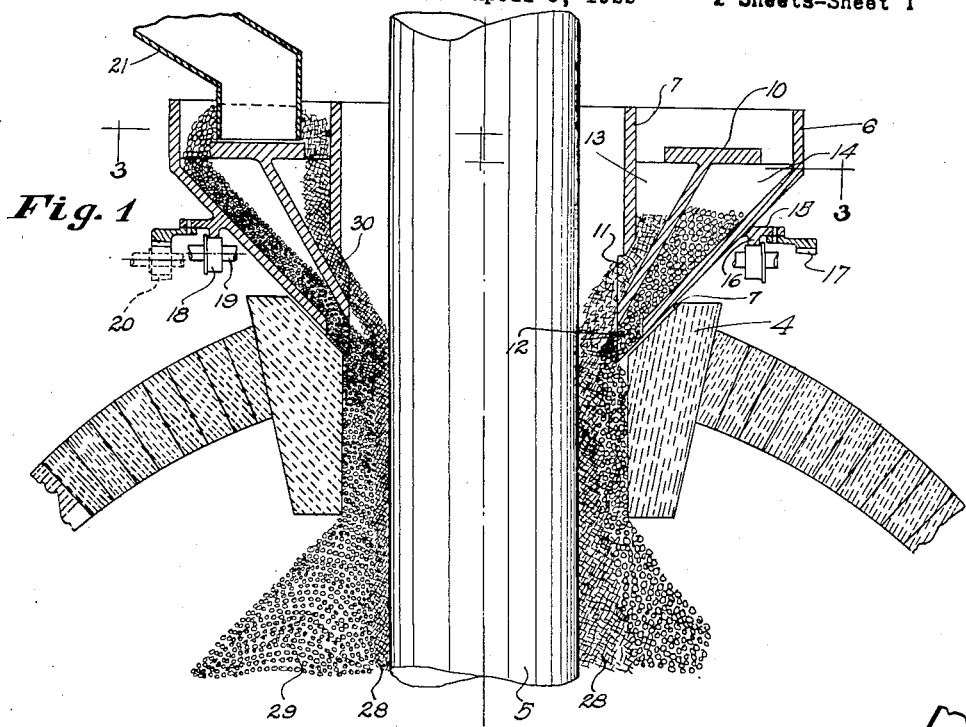
Fig. 1 illustrates in vertical cross-section a portion of the arched roof of an inclined electric smelting furnace having a stock feed conduit depending thereinto and an annular rotatable double hopper adapted for the feeding of the carbon component of the charge adjacent to the electrode and of the phosphate and silicious component of the charge adjacent to the stock feed conduit.

In the embodiment of my invention illustrated, I show an electric smelting furnace having a hearth 1, walls 2, and a roof 3, all preferably formed of continuous refractory material. The roof is preferably of the simple arch type and along its longitudinal center I provide a series of combination stock feed and electrode openings or conduits formed by bricks or blocks 4, which may be built into or otherwise mounted in the furnace top so that their lower ends depend substantially below the roof into the furnace. I do not seek in this case to protect the provision of the stock feed conduits, as thus formed, nor the method of furnace operation which is made possible by their use, as my present invention is confined to the method and means for delivering, into the clearance between a stock feed conduit and the electrode 5 therein, of the stock which is normally composed of phosphate rock, silica, and crushed coke, which latter forms the preferred carbon component of the charge.

Referring now to the structure illustrated in Figs. 1 to 5, I show a rotatable stock feed hopper having an outer annular wall 6 which tapers inwardly and downwardly and enters a taper seat 7 in the top of the stock feed conduit 4. The hopper is provided with an inner cylindrical wall 7 concentric with the outer wall 6 and substantially spaced from the electrode. This inner wall 7 is joined to the outer wall 6 by vertical radial webs 8 which divide the hopper into radial pockets and each of these pockets is in turn subdivided by a circumferentially disposed and inwardly and downwardly inclined partition 9 which extends from the center of the annular stock receiving table 10 downwardly below and beyond the inner wall 7, leaving bottom ports or gates 11 and 12 for the discharge of stock from the pockets 13 and 14, respectively. The stock feed table, which is supported by webs 8, leaves ample clearance on either side between 1 and the hopper walls 6 and 7 for the feed of the stock into the two annular series of pockets 13 and 14.

I provide on the hopper at any convenient point an external annular flange 15 carrying a track 16 and a circular rack 17. The track 16 is mounted to turn on the trunnion or roller supports 18 mounted on fixed bearings 19, while the annular rack 17 meshes a pinion 20 driven by any suitable source of power (not shown) and at a rate to provide a continuous and slow rotation of the hopper. The speed of rotation of the hopper is variable to provide one means for regulating the rate of feed of the stock.

Figure 2:
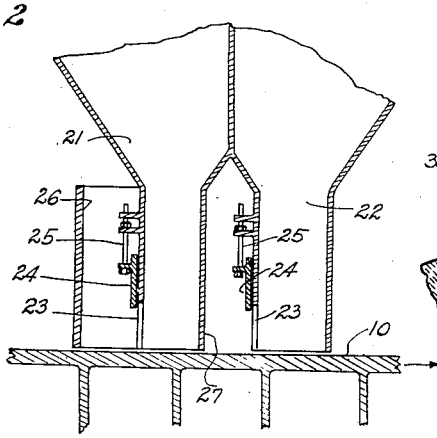
Fig. 2 is a cross-sectional view taken on a circumferential plane 2—2 of Fig. 3 and illustrates the gates for controlling the volumetric flow of stock from the inner and outer hopper compartments.

The stock is fed onto the annular stock feed table 10 by gravity through the chutes 21 and 22, chute 21 being in advance as the hopper rotates in the direction indicated by the arrows in Figs. 2 and 3. The carbon component, from any suitable source of supply, is fed to the chute 21 and flows therethrough by gravity onto the table. The stock is drawn out from the chute 21 by the travel of table 10, the stock flowing out of the chute through a discharge opening 23 under control of a vertically movable regulating gate 24 which is mounted on suitable adjustable supports 25 on the side of the chute. As the stock advances with the table, it strikes a transverse diagonal scraper 26 which reaches from the outer to the inner edge of the table and serves to scrape all of the carbon down out through the chute outlet 23 into the inner series of pockets 13 from which it escapes by gravity through upper series of ports 11 and reaches the clearance between the electrode and the stock feed conduit in the form of an inner circumferential layer or zone immediately surrounding the electrode.

The phosphate rock and silica are fed from any suitable source into the chute 22 and it is fed therefrom through an outlet opening 23 past adjustable gate 24 having a suitable adjustable mounting 25 all as described heretofore, and it is then engaged by a scraper plate 26 forming a part of the wall of the chute 21 and disposed diagonally in a plane at right angles to that of the scraper 26. This will result in all of the phosphate rock and silica being discharged from the table into the outer circumferential series of pockets 14 down which it moves by gravity and passes out through the lower series of ports 12 into the clearance between the electrode and the stock feed conduit where it forms the outer circumferential zone or layer of the stock. The carbon zone is indicated at 28 in Fig. 1 while the coarser particles of the phosphate rock and silica are indicated in the outer zone 29. It will be observed that the radial webs 8 have lower ends 30 which project inwardly beyond the plane of the inner hopper wall 7 so that as the hopper turns, they have a tendency to distribute the stock about the stock feed conduit and to hold the grades of material in their respective pockets 13 and 14 until free to descend by gravity into the clearance.

In operation, having arranged for a suitable source of supply for the various components of the charge to their respective chutes 21 and 22, and having adjusted the gates 24 according to the proportionate and volumetric feed desired for each component, the rotary drive for the hopper is started and its rotation is maintained at the desired R. P. M. As it rotates in the manner described, the carbon component is fed so as to form an inner circumferential layer or zone immediately surrounding the electrode, while the other or coarser components of the charge are fed as an outer circumferential layer surrounding the zone of carbon, both feeds being carried on simultaneously and responsive primarily to the demands of the fusion zone and secondarily to the regulation and operation of the distributing hopper.

Figure 6:
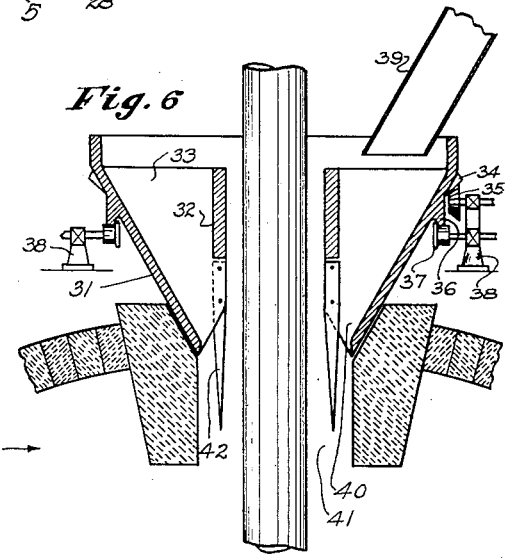
Fig. 6 is a view corresponding to Fig. 1 of a modified type of rotatable hopper having a single stock feeding compartment and provided with stirring elements which project down into the clearance between the electrode and stock feeding conduit.

Referring to Fig. 6, I show a single type of hopper comprising an outer inclined wall 31 and a spaced cylindrical inner wall 32 connected to the outer wall by radial webs 33 which are disposed at a lower level than the top of the wall 31. This latter wall carries an external annular rack 34 meshing a driving pinion 35 and has also formed thereon a track 36 riding on trunnions 37 which have suitable fixed bearings. The previously mixed stock is fed into this hopper between walls 31 and 32 through a chute 39 from any suitable source of supply and flows by gravity through bottom openings 40 into the annular clearance 41 surrounding the electrode. Here the rotation of the hopper obtains a uniform circumferential distribution of the stock previously mixed which stock has the tendency, hereinbefore referred to as it descends into the furnace, of causing its finer carbon particles to tend to descend more nearly in a straight line than the coarser particles of phosphatic materials and silica, and as a result the greater portion of the carbon works down in the center of the stock feed about the electrode. To more effectively stir up and distribute the stock in the clearance 41, I provide stirrer blades 42 attached to the bottom edges of the radial partitions 33 and as these are dragged around through the stock, they loosen it up and cause it to flow more freely and to be more uniformly distributed around the clearance.

Though I have described with great particularity the details of the embodiment of the invention herein shown, it is not to be construed that I am limited thereto as changes in arrangement and substitution of equivalents may be made by those skilled in the art without departing from the invention as defined in the appended claims.

Having thus described my invention, what I claim as new and desire to secure by Letters Patent, is:—

1. The combination with an enclosed electric smelting furnace having an overhead stock feed and electrode opening, of means rotatable about said opening to feed stock to the clearance about the electrode.

2. The combination with an enclosed electric smelting furnace having an overhead stock feed and electrode opening, of means rotatable about the electrode to feed stock to and distribute it around the clearance surrounding the electrode.

3. In an enclosed electric smelting furnace having a roof with a circular opening adapted for the passage of an electrode and a surrounding belt of stock, a circumferentially movable stock distributor adapted to deliver and distribute the stock into the clearance between the electrode and said roof opening.

4. In combination with an electric smelting furnace having a stock feed and electrode opening in its roof, of a hopper rotatable about the electrode and adapted to deliver the stock through the said opening.

5. In combination with an electric smelting furnace having a stock feed and electrode opening in its roof, of an annular hopper rotatable about the electrode and adapted to deliver the stock through the said opening.

6. An electric smelting furnace in accordance with claim 5, in which the inner wall of the annular hopper is substantially spaced from the electrode.

7. In an electric smelting furnace of the character described in claim 4, means carried by the hopper to agitate the stock after it is discharged into the clearance between the electrode and the marginal walls of the feed opening.

8. In combination with an enclosed electric smelting furnace having a stock feed and electrode opening in its roof, an annular hopper mounted to rotate about the electrode and having vertical partitions subdividing it into radial pockets having bottom discharge openings.

9. In combination with an enclosed electric smelting furnace having an overhead stock feed and electrode opening, an annular hopper mounted to rotate about the electrode and having openings adapted to discharge into said stock feed opening, and means to feed the different component elements of the charge through the hopper so as to form inner and outer circumferential layers about the electrode.

10. An electric smelting furnace in accordance with claim 9, in which the means to feed said different grades of material is automatic and primarily responsive to the demands of the fusion zone.

11. In an electric smelting furnace in accordance with claim 9, in which the means for feeding the different grades of material is automatic and adapted to feed the stock primarily responsive to the demands of the fusion zone.

12. In an electric smelting furnace in accordance with claim 9, in which the means for feeding the different grades of material is automatic and adapted to feed the stock primarily responsive to the demands of the fusion zone and which comprises mechanical agencies subject to regulation for exercising a secondary control over the feed of said material.

13. In an enclosed electric furnace having a top stock and electrode opening, rotatable means adapted to feed different grades of material automatically responsive to the demands of the fusion zone and comprising mechanical agencies subject to regulation for a secondary control of the rate of feed for different component elements of the charge.

14. In combination with an enclosed electric furnace having a top opening for the electrode and a feed of stock about the electrode, of means to feed the stock comprising a rotatable hopper subdivided into inner and outer chambers having bottom discharge openings all disposed to discharge into the clearance in the top opening surrounding the electrode.

15. In combination with an enclosed electric furnace having a top opening for the electrode and a feed of stock about the electrode, of means to feed the stock comprising a rotatable hopper subdivided into inner and outer circumferential chambers having bottom discharge openings all disposed to discharge into the clearance in the top opening surrounding the electrode, an annular table on the hopper overhanging both chambers, fixed chutes disposed to discharge stock on said table, and scrapers arranged to discharge the stock for said table into the desired chamber.

In testimony whereof I affix my signature.

BETHUNE G. KLUGH.

Witness:
NOMIE WELSH.